A. S. Macomber.
Turning Lathe.
Nº 6,000.   Patented Jan. 2, 1849.

Inventor:
A. S. Macomber

UNITED STATES PATENT OFFICE.

ARUNAH S. MACOMBER, OF BENNINGTON, VERMONT.

TURNING-LATHE.

Specification of Letters Patent No. 6,000, dated January 2, 1849.

*To all whom it may concern:*

Be it known that I, ARUNAH S. MACOMBER, of Bennington, in the county of Bennington and State of Vermont, have invented a new and useful Improvement on a Turning-Lathe for Turning or Rimming Out the Interior of Boxes for Carriage and other Wheels, whereby the said boxes can be turned or rimmed out of any required taper in a superior manner to any other mode known or used; and I hereby do declare that the following is a full, clear, and exact description.

The nature and principle of my invention consist in placing the box to be turned or rimmed out on a lathe within a revolving chuck through which passes a fixed spindle with a cutter attached to it and connecting the said chuck and stock head to a saddle, which by a slot or slots therein and pivots or centers connecting the said saddle to the slide, allows the saddle, puppet heads and chuck to be set at any angle with the cutter on the spindle, whereby boxes of any required taper may be cut or rimmed out as the chuck revolves around the cutter and moves with the slide.

To enable others skilled in the art to make and use my invention I will proceed to describe its construction and operation, reference being had to the accompanying drawings making a part of this specification, in which—

Figure 1:
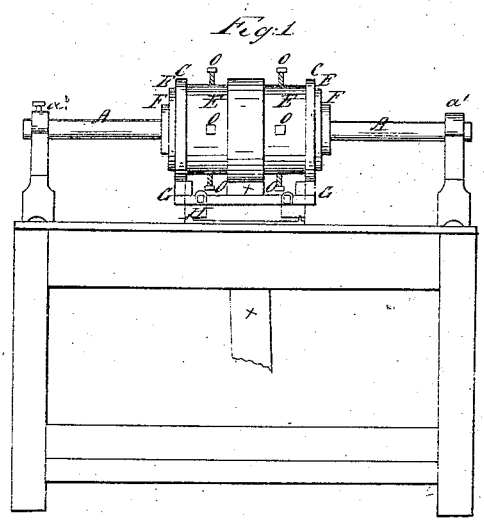
Figure 2:
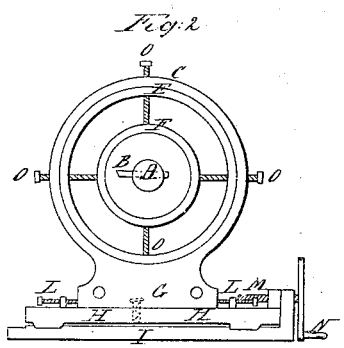
Figure 3:
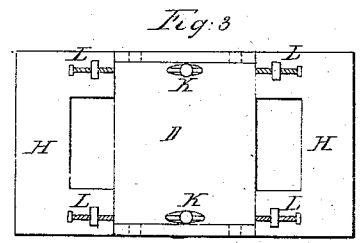

Figure 1, is a side, Fig. 2, an end, and Fig. 3, a semi section vertical view.

The same letters indicate like parts on all the figures.

In Fig. 1, a lathe of the common kind is represented, and those parts not implied in my invention need not be described.

A, is a fixed spindle, secured in proper bearings ($a^1$) and ($a^2$). This spindle can be taken out at pleasure by unscrewing the screw bolt at ($a^2$).

B, is the cutter or chisel firmly secured to the spindle. (C,) (C,) are puppet heads made in the usual way and firmly secured by bolts or pins to the plate or saddle D, represented in Fig. 3.

E, E, is the revolving chuck, resting in the puppets, and exhibited as protruding therefrom in Fig. 1. (*o*) represents set screws passing through the chuck to key or hold firm the box placed within the chuck to be turned or rimmed out.

F, is the box to be turned or rimmed out. It is supported and held secure in the chuck turning around with the chuck.

G, is the puppet stock. It is planed and secured to D, the saddle.

H, H, is a sliding flange or plate frame having a groove on the under part, on each side, to allow it to slide transversely on the slide I.

K, K, are slots in the saddle D, in which are pivots to act as centers, or swivels, for the saddle when moved on H, H, at any angle with the cutter on the spindle.

L, L, L, L, are screws working through eyes on the slide flange H, with their points or ends pressing the sides of the saddle so as to hold it firm and secure on the slide and also at the point or angle with the cutter, at which it may be set.

M is a screw worked by a handle N. It passes through an eye in the slide and an eye on the flange H, H, to hold the two firm and solid together and also for allowing the flange to be moved somewhat transversely on the rails of the slide as seen in Fig. 2. All the parts described are constructed in the usual manner, with the exception of the pivots K, K, working in the slots seen in Fig. 3, whereby the saddle D, can be set at any angle with the cutter. The saddle can be moved transversely on the lathe and set angularly on it likewise by the pivots, K, K, acting as swivels or centers, for the saddle. The slide flange H, H may be moved somewhat transversely on the slide, but cannot be set at any angle with the cutter, as the saddle can be, therefore, it is by the manner in which D, is constructed and operated that boxes for carriages &c. can be turned or rimmed out of any taper required. To do this, the operation is as follows: Let the box to be turned or its interior rimmed out, be placed in the chuck, as represented in Fig. 2, and if I desire to rim it out, I loosen the screws L, L, in their eyes and move the saddle D, transversely on H, H, (and thus the stock, puppets and chuck and box with it) until the inside of the box at one side presses against the knife or cutter chisel B. I then set the chuck in motion (having first made it secure and firm by the screws) by the driving band X, which passes down to the driving shaft, and as the chuck revolves around the spindle and the slide moves in the usual way, the cutter by being in contact with the inside of the box F, while the chuck revolves, rims out the interior of the box.

If I desire to increase the taper of a box, I set the saddle at such point on H, H, so that the center of one end of the box F, shall be farther from the cutting point of the chisel, than the center of the other end of the box is set from the cutting line. The less taper that is desired in boxes, the more nearly equidistant from the cutter point are the centers of both ends of the box in the chuck set, and the greater the taper wanted, the center of one end of the box, is set at a greater, or the greatest distance from the cutting point while at the same time, the center of the other end of the box is set more near the cutting line of the cutter. By this mode of setting the saddle D, (and with it the box to be rimmed out) at any angle with the cutter point, one end of the box if need be may be rimmed or turned out and the other end not touched with the cutter at all. The points, or angles at which the saddle and its movable parts, may be set with the cutter point, can be exactly determined by having an index on the upper surface of the flange H, H, and a pointer attached to the puppet stock G. This plan of rimming or turning out the interior of iron boxes of any required taper for wheels &c., can be easily attached to every lathe and for rimming out cylinders, it will allow of a far shorter cutting chisel than is now employed for such a purpose, thereby saving both money and labor.

Having thus explained the nature of my invention, its construction and operation, I do not claim the combination of the saddle D, with the puppets, and chuck, and flange H, H, merely to move crosswise on the lathe, but

I claim—

The saddle D constructed with a slot, or slots combined with pivots or screws, or swivels and with another slot, or slots in L, L, the flange below, whereby the said pivots, will act as centers, or swivels for the saddle to be moved either transversely, or set at any angle with the point of the cutter on the fixed spindle, so that when the box and chuck revolve around the cutter, and with the slide as it moves horizontally on the bed of the lathe, boxes for carriage and other wheels may be turned or rimmed out of any required interior taper substantially as set forth.

ARUNAH S. MACOMBER.

Witnesses:
 LYMAN S. PATCHIN,
 GEORGE R. HOUGHTON.